(12) United States Patent
Limousin et al.

(10) Patent No.: US 12,344,310 B2
(45) Date of Patent: Jul. 1, 2025

(54) ROCKER REINFORCEMENT AND ROCKER FOR A VEHICLE

(71) Applicant: AUTOTECH ENGINEERING S.L., Amorebieta-Etxano (ES)

(72) Inventors: Victor Limousin, Vanves (FR); Vanessa Lopera Cano, Boulogne Billancourt (FR)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 317 days.

(21) Appl. No.: 18/012,087

(22) PCT Filed: Jun. 21, 2021

(86) PCT No.: PCT/EP2021/066781
§ 371 (c)(1),
(2) Date: Dec. 21, 2022

(87) PCT Pub. No.: WO2021/259840
PCT Pub. Date: Dec. 30, 2021

(65) Prior Publication Data
US 2023/0234644 A1 Jul. 27, 2023

(30) Foreign Application Priority Data
Jun. 23, 2020 (EP) .................... 20382553

(51) Int. Cl.
*B62D 25/02* (2006.01)
*B62D 21/15* (2006.01)
*B62D 29/00* (2006.01)

(52) U.S. Cl.
CPC ........ *B62D 21/157* (2013.01); *B62D 25/025* (2013.01); *B62D 29/008* (2013.01)

(58) Field of Classification Search
CPC ... B62D 25/025; B62D 21/157; B62D 29/008
(Continued)

(56) References Cited

U.S. PATENT DOCUMENTS 8,702,161 B2    4/2014 Charbonneau et al.
9,033,404 B2 *  5/2015 Meaige ............... B62D 25/025
                                                    296/193.06

(Continued)

FOREIGN PATENT DOCUMENTS

DE      10248846 A1    4/2004
DE   102016223492 B3    4/2018
EP       3090923 A1   11/2016

OTHER PUBLICATIONS

International Search Report mailed Aug. 17, 2021 for PCT Application No. PCT/EP2021/066781; 4 pages.
(Continued)

*Primary Examiner* — Dennis H Pedder
(74) *Attorney, Agent, or Firm* — Squire Patton Boggs (US) LLP

(57) ABSTRACT

The present disclosure relates to a rocker for a vehicle and a rocker reinforcement. Examples of the present disclosure include a cross section of a rocker reinforcement comprising two convex four-sided structures with their horizontal diagonals substantially parallel to a transverse horizontal direction, and the convex four-sided structures being separated along a vertical direction.

20 Claims, 6 Drawing Sheets

(58) Field of Classification Search
USPC .............................. 296/209, 187.12, 29, 30
See application file for complete search history.

(56) References Cited

U.S. PATENT DOCUMENTS

| | | |
|---|---|---|
| 12,012,149 B2* | 6/2024 | Ignes ..................... B62D 25/00 |
| 2010/0140981 A1 | 6/2010 | Mildner et al. |
| 2018/0065678 A1* | 3/2018 | Tutzer .................. B62D 29/043 |

OTHER PUBLICATIONS

Written Opinion of the International Searching Authority mailed Aug. 17, 2021 for PCT Application No. PCT/EP2021/066781; 6 pages.

* cited by examiner

ROCKER REINFORCEMENT AND ROCKER FOR A VEHICLE

CROSS-REFERENCE

The present application is a National Stage filing under 35 U.S.C. § 371 of International Patent Application No. PCT/EP2021/066781, filed Jun. 21, 2021, which claims the benefit of and priority to European Patent Application No. 20382553.4, filed Jun. 23, 2020, the contents of all of which are hereby incorporated by reference in their entireties for all purposes.

FIELD

The present disclosure relates to a rocker for a vehicle and a rocker reinforcement, as well as to methods of manufacturing and attaching a rocker reinforcement to a rocker.

BACKGROUND

Vehicles such as cars incorporate a structural skeleton designed to withstand all loads that the vehicle may be subjected to during its lifetime. The structural skeleton or "Body In White (BIW)" is further designed to withstand and absorb impacts, in case of e.g. collisions with other cars. The structural skeleton is also designed to be as lightweight as possible in order to reduce the emission of pollutants such as $CO_2$ to the environment or to reduce the consumption of electricity in an electric vehicle.

The structural skeleton or BIW of a car for instance may include bumpers, pillars (e.g. A-pillar, B-pillar, C-pillar), side impact beams and rocker panels. These and other structural members may have one or more regions with a substantially U-shaped (also known as "hat"-shaped) cross section. These structural members may be manufactured in a variety of ways and may be made of a variety of materials. For instance, rocker panels may be made of steel, particularly Ultra-High Strength Steels (UHSS) and may be manufactured through press hardening.

Ultra-High Strength Steels (UHSS) exhibit optimized maximum strength per weight unit and advantageous forming properties in the automotive industry, for the structural framework of the vehicle or at least a number of its components. The UHSS may have a maximum tensile strength of at least 1000 MPa, preferably up to about 1500 MPa or up to 2000 MPa or more.

An example of an UHSS used in the automotive industry is 22MnB5 steel.

Processing a component for a vehicle may comprise forming of a metal plate, in particular a steel plate in order to give the plate a desired shape.

One process that is used particularly in the automotive industry is Hot Forming Die Quenching (HFDQ). In the HFDQ process, a steel blank is heated to above austenization temperature, above Ac1 or above Ac3. After heating to above the austenization temperature, the blanks are placed in a hot forming press. The blanks are deformed and at the same time are quenched (rapidly cooled down). Cooling down may typically occur at a rate that is higher than a so-called critical cooling rate. The critical cooling rate for steels in HFDQ may be around 27° C./s. As a results of the quenching, the deformed blank may obtain a martensitic microstructure. Depending on the exact temperature and the heating time, a fully martensitic microstructure can be obtained. The resulting product in this manner can obtain a high hardness, and corresponding high ultimate tensile strength, and high yield strength. On the other hand, maximum elongation (elongation at break) may be relatively low.

Tailored heating, or tailored in-die cooling may be used to provide so-called "soft zones", i.e. areas with higher ductility, and lower ultimate tensile strength and yield strength. The microstructure in these areas may not be fully martensitic. They may comprise one or more of martensite, bainite, ferrite and perlite depending on the heat treatment they have been submitted to. Apart from tailored heating or cooling, also a partial heat treatment after HFDQ may be used. E.g. an induction heater of a laser may be used to locally heat treat an area of the press hardened product. Heating time, maximum temperature and cooling rate may be adapted to obtain desired mechanical properties in terms of ductility, hardness, yield strength etc. and the corresponding microstructure.

A rocker panel, or rocker, lies along a side of the vehicle, below an opening for the door(s) and extending between a front wheel opening and a rear wheel opening. A rocker generally includes two portions or panels which are joined to each other at corresponding flanges along the longitudinal direction of the rocker (and thus the longitudinal direction of a vehicle too), namely an inner rocker panel and an outer rocker panel. An inner rocker panel faces the vehicle interior whereas an outer rocker panel faces away from the vehicle. Rockers are important for absorbing sufficient energy while avoiding an excessive intrusion of the sides of a vehicle during a crash, especially in a lateral crash. Rockers are useful not only for protecting a passenger in a vehicle, but also for protecting one or more battery boxes in electrical vehicles. The performance of a rocker, for instance in terms of energy absorption and intrusion, may be tested with e.g. a Euro NCAP's test.

A way to enhance energy absorption while providing an adequate level of deformation of a rocker may be adding a reinforcement to the rocker, e.g. between the inner rocker and the outer rocker panels. Optimizing the materials, geometry and means of attaching a rocker reinforcement to a rocker is important to improve the energy absorption and the integrity of the rocker during a crash while keeping a lightweight piece.

The present disclosure aims to provide improvements in rocker reinforcements.

SUMMARY

Throughout this disclosure, a longitudinal direction, a vertical direction and a transverse horizontal direction are defined for providing spatial orientation of a rocker and a rocker reinforcement attached to the rocker. These directions are substantially perpendicular among them. Thus, a rocker has a length along the longitudinal direction, a height along the vertical direction and a width along the transverse horizontal direction; and a cross section of the rocker is defined by a plane substantially perpendicular to the longitudinal direction, thus including the vertical direction and the transverse horizontal direction. Likewise, a rocker reinforcement has a length along the longitudinal direction, a height along the vertical direction and a width along the transverse horizontal direction; and a cross section of the rocker reinforcement is substantially perpendicular to the longitudinal direction and includes the vertical direction and the transverse horizontal direction.

Accordingly, when a rocker receives an impact, e.g. during a vehicle crash in the road, a side impact may be assumed to be substantially in a transverse horizontal direction in a standardized crash test. In practice at least the impact may include a component substantially parallel to the horizontal direction.

In a front crash, or SORB test ("Small Overlap Rigid Barrier"), the impact may be assumed to be substantially along a longitudinal direction in accordance with the above definitions. In the present disclosure, the focus will be primarily on side impacts.

In a first aspect, a reinforcement for a rocker is provided. The reinforcement is made of an elongated profile and configured to be arranged along a longitudinal direction. A vertical direction is defined as perpendicular to the longitudinal direction, and a transverse horizontal direction is defined as perpendicular to both the longitudinal direction and the vertical direction.

The profile comprises an outer section configured to receive an impact of an outer panel of the rocker, an inner section comprising an upper convex four-sided structure with an upper horizontal diagonal and an upper inclined diagonal and a lower convex four-sided structure with a lower horizontal diagonal and a lower inclined diagonal. The upper and lower horizontal diagonals are substantially parallel to the transverse horizontal direction and the upper and lower convex four-sided structures are separated along the vertical direction.

A convex four-sided structure has two diagonals, e.g. a horizontal diagonal and an inclined diagonal. Herein, it shall be understood that an inclined diagonal is inclined with respect to a corresponding horizontal diagonal and may be perpendicular to it. If one of the diagonals substantially lies in a transverse horizontal direction, when the rocker receives an impact, the convex four-sided structure may be compressed such that a direction of a horizontal component of the impact is changed into a more vertical direction. In other words, placing a diagonal of such a structure into the transverse horizontal direction may transform substantially horizontal stresses into substantially vertical, or at least more vertical, stresses during a crash. Accordingly, energy may be diverted away from a battery box, and possibly also passengers and safety may be increased.

Having a rocker reinforcement with two of these structures oriented as indicated above provide increased energy absorption and substantially horizontal stresses into (more) vertical stresses conversion. Herein, the two convex four-sided structures are separated such that deformation of the two structures along a vertical direction may occur during a crash. In an example, an empty space may separate the upper and the lower convex four-sided structures.

In some examples, a horizontal diagonal is longer than the corresponding inclined diagonal. This may enable a greater conversion of horizontal stresses into vertical stresses. This is due to the fact that a longer horizontal diagonal provides a longer path for absorbing energy and a shorter vertical diagonal enables more expansion along a substantially vertical direction. The height and width of the four-sides structures may be varied within the scope of the present disclosure.

In some examples, the inclined diagonals are perpendicular to the horizontal diagonals, i.e. the upper inclined diagonal is an upper vertical diagonal and the lower inclined diagonal is a lower vertical diagonal. As a rocker is in particular, although not only, designed to support side impacts, i.e., impacts in a substantially horizontal direction or at least with a large component in the horizontal direction, having perpendicular diagonals enhance the modification of direction of substantially horizontal stresses to a substantially vertical direction.

In some examples, the lower convex four-sided structure and the upper convex four-sided structure are substantially the same. I.e., they may have a substantially same shape, size, thickness, and they may be made of a same material. In these or other examples, an axis on which the upper vertical diagonal lies and an axis on which the lower diagonal lies overlap. I.e. they are aligned or closely aligned along a vertical line. This overlapping may enable that the corners of the two convex four-sided structures may touch when the structures are compressed, thereby increasing energy absorption. In general, energy absorption may be enhanced when the two structures come into contact, it is not necessary that the corners are the ones making contact. However, this configuration may increase the probability that the two four-sided structures, in particular the corners of the structures, come into contact.

In some examples, the reinforcement is an extruded profile. In other example, a profile may be formed with roll-forming. Extrusion may be regarded as more suitable for profiles with a closed cross-section.

In some examples, the reinforcement is made of extruded aluminum. This reduces the weight of the rocker reinforcement. Herein, aluminum may cover aluminum and its alloys. Particularly aluminum 6XXX and 7XXX ("6000" and "7000" series) may be used.

In some examples, the inner panel and the outer panel of the rocker are made of an ultra-high strength steel, specifically a press hardened ultra-high strength steel, e.g. a boron steel. A combination of lightweight aluminum for absorbing energy and UHSS for strength can lead to a good combination of energy absorption and impact resistance.

In some examples, a thickness of the reinforcement, e.g. the thickness of all the segments of the rocker reinforcement in cross section, may be between 1.5 and 5 mm, specifically between 2 and 4 mm, and more specifically about 3 mm. These dimensions, in particular for an extruded aluminum rocker reinforcement, may confer a sufficient strength to the reinforcement while maximizing the energy absorption.

In some examples, the inner section and the outer section each form closed cross-sections. In accordance with these examples, torsion resistance and strength may be improved.

In some examples, the outer section may have a substantially vertical outer wall. A substantially vertical outer wall provides a surface for receiving an impact from the outer rocker panel and can help to provide stability in the deformation during a crash event.

In some examples, the outer section may have substantially horizontal segments connecting the outer wall with the inner section, the horizontal segments optionally defining hinge points. The horizontal segments of the outer section may absorb impact energy by deforming, before the inner section is deformed. Providing hinge points, e.g. by connecting several horizontal segments at obtuse angles enables better control of the kinematics of deformation.

In a further aspect, a method for manufacturing a rocker for a vehicle with a rocker reinforcement attached to the rocker as described herein is provided. The method comprises: providing a rocker including an inner wall, an outer wall, a lower portion and an upper portion, providing an aluminum rocker reinforcement with a cross section described throughout this disclosure by extrusion, and mechanically attaching the rocker reinforcement to the rocker such that the upper and lower horizontal diagonals are substantially parallel to the transverse horizontal direction.

This method may enable enhancing energy absorption and convert substantially horizontal stresses into substantially vertical, or at least more vertical, stresses when the rocker receives an impact. Passenger safety may thus be increased.

In some examples, fasteners or attachment points are used to attach the ends of the rocker reinforcement to an outer wall and/or an inner wall of the rocker. In these or other examples, fasteners or attachment points may also be used to attach a more central portion of the reinforcement to the rocker. Fastening means may include metallic strips and screws. Other possible fastening means may include an adhesive or resin or rivets. More than one fastening means may be used. In an example, rivets and adhesive may be combined. Additionally or alternatively, one or more fasteners may be used to attach the reinforcement to a lower and/or an upper portion of the rocker.

One or more "softzones" may be created on the rocker, e.g. on an inner wall, in order to control the kinematics of deformation and in order to be able to absorb more energy. Also soft zones may facilitate the attachment of the reinforcement to the inner wall using fasteners. Rivets may in particular facilitate said attachment. The type and location of fasteners may be adapted e.g. to the length of the rocker reinforcement.

BRIEF DESCRIPTION OF THE DRAWINGS

Non-limiting examples of the present disclosure will be described in the following, with reference to the appended figures, in which.

The figures refer to example implementations and are only be used as an aid for understanding the claimed subject matter, not for limiting it in any sense.

DETAILED DESCRIPTION OF EXAMPLES

Figure 1:
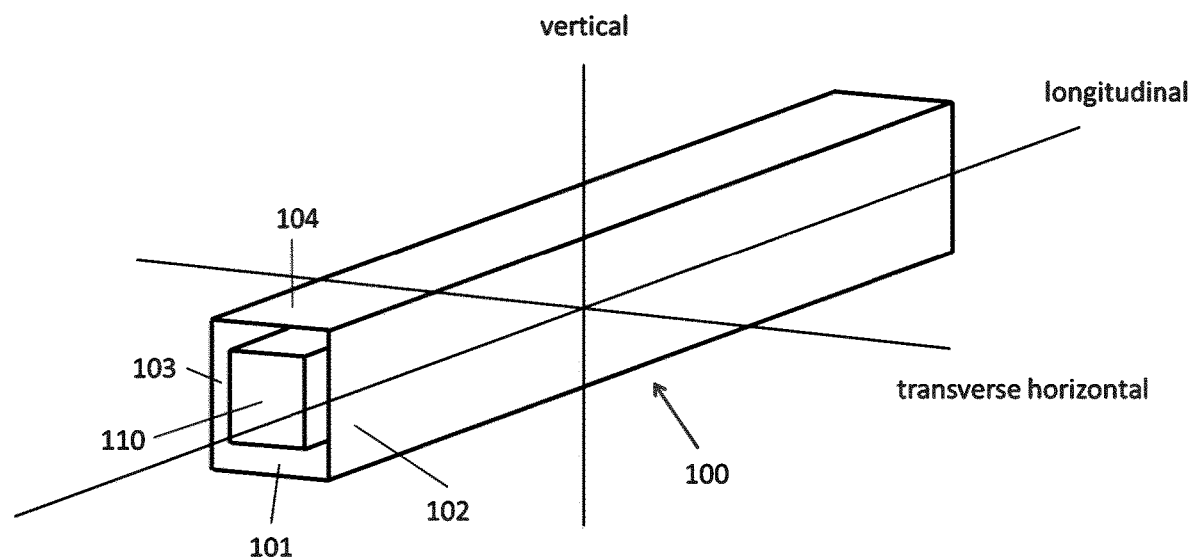
FIG. 1 schematically illustrates the directions used throughout this disclosure for orienting a rocker and a rocker reinforcement.

FIG. 1 schematically represents a rocker 100 and a rocker reinforcement 110 inside the rocker 100 to illustrate a longitudinal direction, a vertical direction and a transverse horizontal direction as used throughout this disclosure. These directions are substantially perpendicular to each other.

The longitudinal direction, of both the rocker 100 and the rocker reinforcement 110, also substantially corresponds to the longitudinal direction of a vehicle to which rocker 100 with the rocker reinforcement 110 may be mounted. The following explanation regarding longitudinal, vertical and transverse horizontal direction is generally applicable to the remainder of the disclosure.

A rocker 100 has a length along the longitudinal direction, a height along the vertical direction and a width along the transverse horizontal direction. A cross-section of the rocker is defined by a plane substantially perpendicular to the longitudinal direction, thus including the vertical direction and the transverse horizontal direction.

Similarly, a rocker reinforcement 110 has a length along the longitudinal direction, a height along the vertical direction and a width along the transverse horizontal direction. A cross-section of the rocker reinforcement is substantially perpendicular to the longitudinal direction and includes the vertical direction and the transverse horizontal direction.

In some examples, the length of the rocker reinforcement 110 may be substantially equal to the length of the rocker 100. In some other examples, the length of the rocker reinforcement 110 may be less than the length of the rocker 100, but the reinforcement may have a length of at least 25%, or at least 50%, and even at least 75% of a length of the rocker in which it is incorporated. In these examples, a rocker 100 may include one or more rocker reinforcements 110.

Extruded profiles are specifically suitable when a long reinforcement is required. Alternatively roll-forming may be used.

A rocker 100 may include an inner wall 103, an outer wall 102, a lower portion 101 and an upper portion 104. The lower portion 101 and upper portion 104 may typically include a mounting flange for mounting e.g. an outer rocker panel and an inner rocker panel to each other, and to mount the rocker to other components of the vehicle framework.

Figure 2:
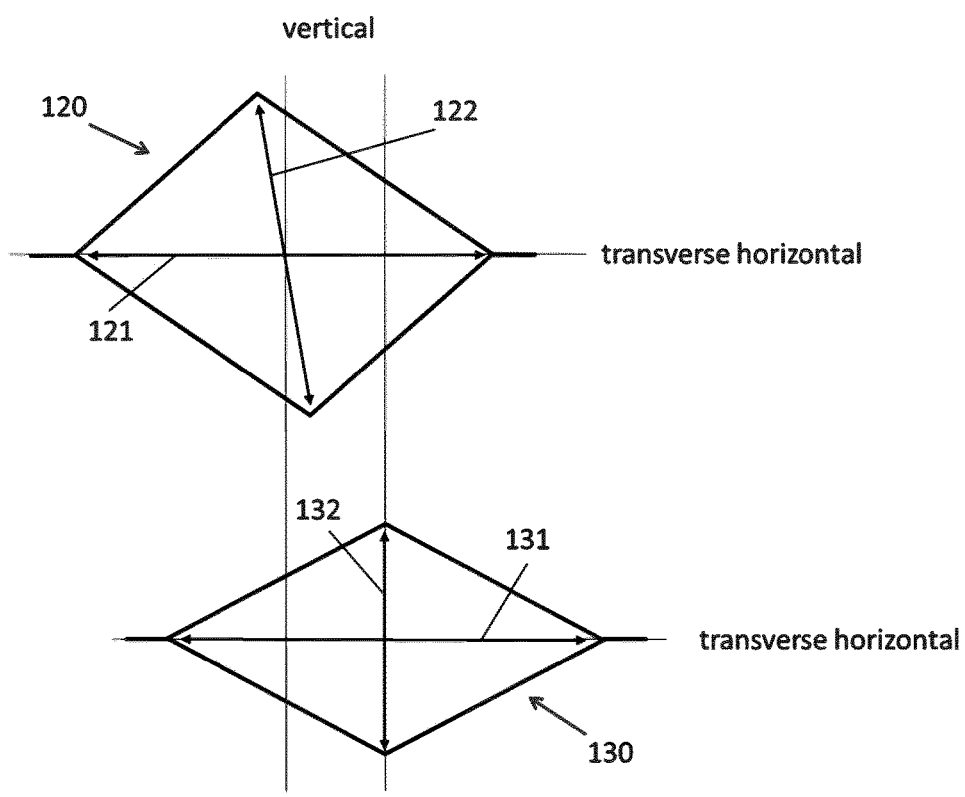
FIG. 2 schematically illustrates two convex four-sided structures included in a cross section of a rocker reinforcement according to an example.

FIG. 2 schematically illustrates an upper convex four-sided structure 120 and a lower convex four-sided structure 130 included in a cross section of a rocker reinforcement 110. The two convex four-sided structures 120, 130 are separated along a vertical direction.

It shall be understood that the terms "upper" and "lower" are not meant to restrict to structures 120, 130 that are exactly arranged above the other, but rather that these terms are merely used to differentiate two convex four-sided structures separated along a vertical direction.

A convex four-sided structure 120, 130 may e.g. be parallelogram, and specifically a square, a diamond or rhombus, a rectangle, or a rhomboid. For instance, structure 120 represents a rhomboid and structure 130 represents a diamond in the example of FIG. 2, both representing parallelograms. A convex four-sided structure includes two diagonals. In FIG. 2, structures 120 and 130 include a horizontal diagonal 121, 131 and an inclined diagonal 122, 132. The upper horizontal diagonal 121 and the lower horizontal diagonal 131 are substantially parallel to the transverse horizontal direction. The structures are thus arranged to specifically absorb an impact along the transverse horizontal direction.

Diagonals 122 and 132 are shown to be inclined with respect to the horizontal diagonal, and thus with respect to a substantially transverse horizontal direction. In particular, lower inclined diagonal 132 is substantially perpendicular to lower horizontal diagonal 131. In this case, wherein the two diagonals 131, 132 are substantially perpendicular, an inclined diagonal 132 may be referred to as vertical diagonal 132.

When a rocker reinforcement 110 with a cross-section comprising two convex-four sided structures 120, 130 is included in a rocker 100 and the rocker 100 receives an impact, e.g. during a vehicle accident, the convex four-sided structures 120, 130 may be compressed such that substantially horizontal components of the impact may be diverted into a more vertical direction. At the same time, energy may be absorbed during the compression of the convex four-sided structures 120, 130. Thus, reinforcement 110 may not only absorb energy during a crash, but it may also divert energy away from a battery box. Also, passenger safety may be improved.

The convex four-sided structures 120, 130 are separated along a vertical direction. In particular, structures 120 and 130 are separated such that they may deform along a vertical direction when rocker 100, and thus rocker reinforcement 110, receives an impact. In an example, an empty space may separate the upper convex four-sided structure 120 and the lower convex four-sided structure 130.

A vertical distance between the convex structures and their positions along a transverse horizontal may be chosen such that when the structures are deformed in a vertical direction, and the convex structures may encounter each other. When they encounter each other, they support each other. The rocker reinforcement in deformation thus can absorb significant energy.

Although a cross-section of the rocker reinforcement 110 in this example includes two convex four-sided structures 120, 130 in FIG. 2, other number of convex four-sided structures are possible. In an example, a cross-section of a rocker reinforcement comprises three or more convex four-sided structures with the horizontal diagonals aligned in a substantially transverse horizontal direction.

In FIG. 2, the horizontal diagonal 131 is longer than the vertical diagonal 132 in the lower convex structure 130. Thus, diagonal 131 offers a longer path that may be compressed, and energy absorption may therefore be increased. Also, a longer path in a substantially transverse horizontal direction allows converting more substantially horizontal stresses into substantially vertical, or more vertical, stresses. Hence, this advantage also applies to a horizontal diagonal being longer than an inclined diagonal, even if the inclined diagonal is not a vertical diagonal. The height and width of the four-sides structures may be varied within the scope of the present disclosure.

Figure 3:
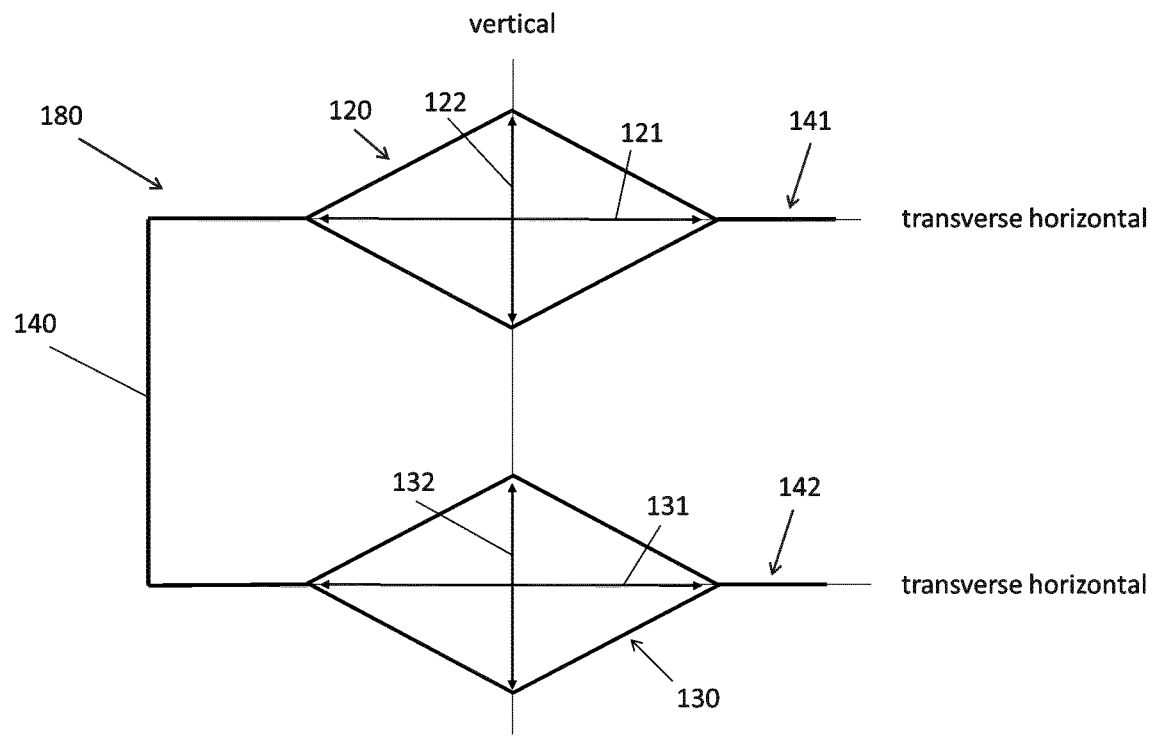
FIG. 3 schematically represents a portion of a cross section of a rocker reinforcement according to an example.

FIG. 3 schematically represents a portion of a cross section of a rocker reinforcement 110, in particular an inner section of a rocker reinforcement. The inner section of the rocker reinforcement in use is positioned closer to an inner rocker panel than to an outer rocker panel. The rocker reinforcement 110 has a perimeter 180 in cross section. In this example, a portion of the perimeter 180 is shown. Perimeter 180 may include an upper portion 141 and a lower portion 142, and a vertical segment 140 connecting both. In this example, the segments of the upper 141 and lower 142 portions shown are substantially parallel to a transverse horizontal direction. Furthermore, the upper 120 and the lower 130 convex four-sided structures are incorporated in an upper 141 and lower 142 portion of the cross section of the rocker reinforcement, respectively.

The inner section of the rocker reinforcement in this example forms part of the same single extruded profile. The two convex four sides structures are connected by a vertical segment of the profile. Thereby, the two structures 120, 130 have sufficient vertical space to expand into during a crash. This also enhances the conversion of substantially horizontal stresses into more vertical stresses.

Also, the inclined diagonals 122, 132 of both convex four-sided structures 120, 130 are vertical diagonals 122, 132 in this example. Thus, stress deviation into a more substantially vertical direction may be obtained than when an inclined diagonal is not a vertical diagonal.

A vertical diagonal may lie along a substantially vertical axis. Accordingly, when two vertical diagonals are present, the axes on which the vertical diagonals lie may coincide or may not exactly coincide in order to adapt to surrounding parts and to load directions that may occur in a crash (e.g. in a test). In FIG. 3, the axis on which the upper vertical diagonal lies and the axis on which the lower diagonal lies coincide. This overlapping may enable that the lower corner of the upper convex four-sided structure 120 and the upper corner of the lower convex four-sided structure 130 may come into contact during a crash. This contact may contribute to maximize energy absorption by the rocker reinforcement 110.

In addition, the portion of a cross section of the rocker reinforcement 110 of FIG. 3 also includes the two convex four-sided structures having substantially the same dimensions, e.g. length of diagonals. In other words, one may think that a lower portion or convex four-sided structure may correspond to the upper portion or upper convex four sides structure. This kind of symmetry may make the response of the rocker reinforcement 110 more homogeneous to impacts coming from a direction different from the transverse horizontal direction, for example for an impact having an inclination of substantially +20° or −20° (i.e., 340°) with respect to a transverse horizontal direction. That is to say, as a direction of an impact is usually not known before the impact occurs, the possibility of diverting stresses to a substantially vertical direction may be substantially the same for impacts coming in a substantially non-transverse horizontal direction.

Figure 4:
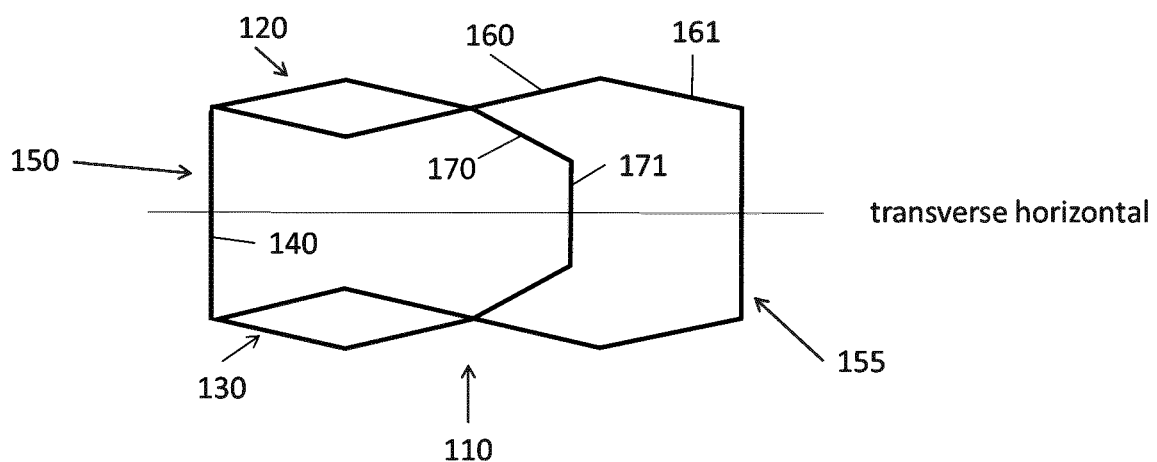
FIG. 4 schematically represents a cross section of a rocker reinforcement according to an example.

FIG. 4 schematically represents a cross section of a profile of a rocker reinforcement 110 in accordance with an example. The rocker reinforcement comprises an outer section 155 configured to be arranged near the outer panel or an outer wall of the rocker and configured to absorb an impact of the outer panel. The inner section 150 is connected to the outer section 155 and arranged closer to the rocker inner panel or to a rocker inner wall.

In this example, a cross section of a rocker reinforcement 110 includes an inner section 150 and an outer section 155 along the transverse horizontal direction. The inner section may include an inner opening or empty space in the inner section, and the outer section may include an outer opening or empty space. Herein, "inner opening" refers to an opening in the inner section, i.e. the section that is arranged closer to an inner rocker panel than to an outer rocker panel. Likewise, "outer opening" refers to an opening closer to an outer rocker panel than to an inner rocker panel.

Having a rocker reinforcement 110 cross section with two sections along a transverse horizontal direction enables to consider two deformation stages for the rocker reinforcement 110, a first one for the portion of the rocker reinforcement 110 including the outer section 155 and a second one for the portion of the rocker reinforcement 110 including the inner section 150. Having two stages of compression increases the among of energy absorbed by a rocker reinforcement 110. Also, the two stages may be configured and optimized for different roles in energy absorption. The outer section receives the impact and transmits it to the inner section. The outer section and inner section may have a different thickness in some examples to adapt it for its specific purpose. In some examples, the segments of a rocker reinforcement 110 in cross-section may have different thicknesses also within the outer and within the inner section.

In some examples, the outer section 155 may additionally or alternatively include one or more convex four-sided structures 120, 130, e.g. a structure 120 in an upper perimeter 141 and a structure 130 in a lower perimeter 143 of the outer section 155.

FIG. 4 also shows that a perimeter of the outer section 155 substantially along the transverse horizontal direction includes two segments 160, 161 forming an obtuse angle. Segments 160 and 161 are adjacent segments. An obtuse angle between two segments 160, 161 provides for a hinge point between the two segments and may contribute to energy absorption and control the kinematics of deformation in case of an impact. Such a configuration of a perimeter of the outer section 155 may thereby enable for a reproducible compression behavior of the rocker reinforcement 110, e.g. when compared to placing a convex four-sided structure along an upper perimeter of both the outer section 155 and inner section 150. It was found by the inventors that this would render the collapse in case of an impact and the corresponding energy that can be absorbed less predictable. The reinforcement may be placed closer to an outer side of the rocker and e.g. be attached at the outer wall of the rocker, or the reinforcement may be placed closer to an inner side of the rocker, e.g. be attached at an inner wall of the rocker.

In addition, in FIG. 4 a perimeter of the outer section substantially along the vertical direction includes two segments 170, 171 joined forming a concave angle. Therefore, a perimeter of the outer section 155 substantially along the vertical direction may contribute to absorb energy during the compression of the outer section 155 whereas the deformation of the two four-sided structures 120, 130 during the compression of the inner section 150 may not be interfered with.

Figure 5:
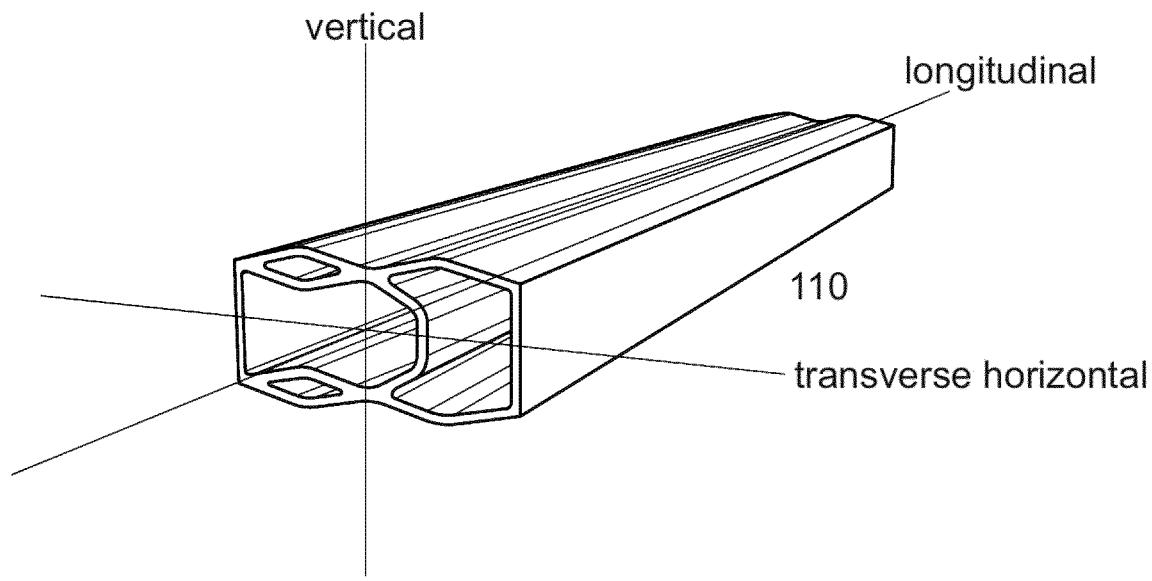
FIG. 5 illustrates a rocker reinforcement according to an example.

FIG. 5 illustrates a rocker reinforcement 110 according to an example. Rocker reinforcement 110 has a cross section like the cross section of FIG. 4. The rocker reinforcement 110 may be made of extruded aluminum. Using aluminum reduces the weight of the rocker reinforcement 110, and thus the weight of a rocker 100 and a vehicle to which the rocker 100 may be mounted to. The use of aluminum also facilitates the obtention of a rocker reinforcement 110 with a cross section like the cross section shown in FIGS. 4 and 5 by extrusion. Adapting the thickness(es) and shape(s) in cross section of a rocker reinforcement 110 is also easier with the use of aluminum and extrusion. A length of a rocker reinforcement 110 may likewise be easily tailored. In an example, the length of a rocker reinforcement 110 may be about 1 m or 1.5 m. The length of the rocker reinforcement may vary in particular as a function of the length of the rocker, but also the geometry and available space inside the rocker may play an important role.

In this or some other examples, the thickness of all the segments of the rocker reinforcement 110 in cross-section may be between 1.5 and 5 mm, and specifically about 3 mm. A rocker reinforcement 110 made of extruded aluminum with these dimensions in cross section may provide an appropriate strength to the rocker reinforcement 110, e.g. similar to the strength of a rocker reinforcement 110 made of steel, while maximizing energy absorption.

Suitable aluminum alloys include the aluminum 6000 series or aluminum 7000 series. Suitable aluminum alloys include e.g. 6005, 6060, 6061, 6063, 6082 and 6106.

Figure 6A:
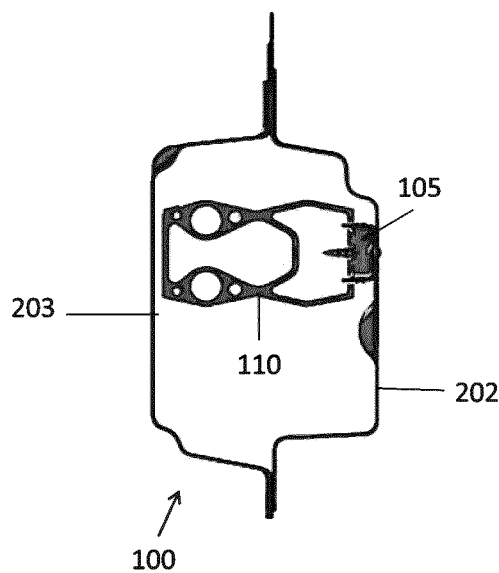
FIGS. 6A and 6B represent a cross section of a rocker with a rocker reinforcement attached to the rocker according to two examples.
Figure 6B:
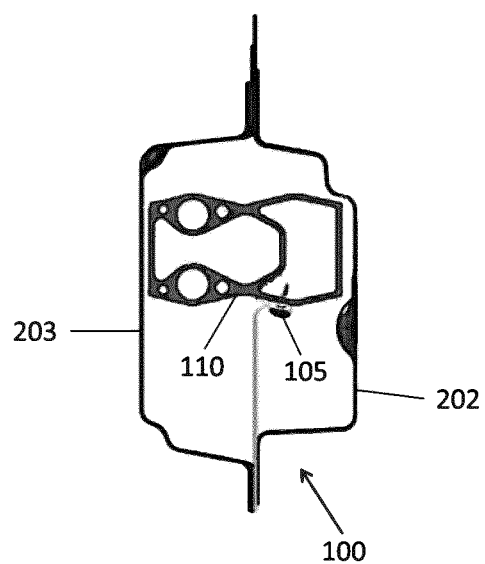

FIGS. 6A and 6B represent a cross section of rocker 100 with a rocker reinforcement 110 attached to the rocker 100 through fasteners 105. Rocker 100 includes a rocker outer panel 202 and a rocker inner panel 203. The attachment between the rocker reinforcement 110 and the rocker 100 is performed differently in FIGS. 6A and 6B. In FIG. 6A, fastening means 105 may be a steel strip with an end joined to an interior of the rocker outer panel 102 and another end fixed to a lateral portion of an outer section 155 of the rocker reinforcement 110 by a screw or rivet.

The steel strip may be made from a high strength steel, specifically from a high strength low alloy steel. In an example, HSLA420 as commercialized by ArcelorMittal may be used. Similar steels include e.g. Docol® 420LA. "420" as used in these examples indicates a minimum yield strength for the steels. It should be clear that alternative steels may also be used.

In FIG. 6B, a steel strip may also be used, but an end of the strip may be joined to a flange or to flanges of the outer and/or inner panels 202, 203 and another end may be joined to a lower portion of an outer section 155 of the rocker reinforcement 110 by a screw or rivet. In an example, the attachment of FIG. 6A may be used to join and end of the rocker reinforcement 110 to the rocker 100 and the attachment of FIG. 6B may be used to join an inner (more central) portion of the rocker reinforcement 110 to the rocker 100. This may be further seen in FIGS. 8-10. The attachment or method of joining may also be used at or near the ends of the reinforcement, and at more central portions of the reinforcement too.

FIGS. 6A and 6B also show a cross section of a rocker reinforcement 110 which has a cross-section that is slightly different from the cross-section shown in e.g. FIG. 5. An interior of the convex four-sided structures is more rounded in FIGS. 6A and 6B. Also, the corners of the four-sided structures which are substantially aligned in the transverse horizontal direction include a small hole. The cross sections illustrated in FIGS. 6A and 6B represent alternatives to the cross section illustrated in e.g. FIG. 5.

In the example of FIG. 6, the convex four-sides structures are partially webbed, i.e. material extends at least partially between several edges of the four-sided structures.

An aspect of rocker reinforcement 110 is that its shape and/or dimensions in cross section allows the use of this rocker reinforcement 110 in a wide variety of rockers 100. There is no need to adapt a specific design of rocker 100 so that rocker reinforcement 110 may be attached to the rocker 100. Also, the dimensions of rocker reinforcement 110 may be changed if it needs to be adapted to a particular rocker 100 shape. Therefore, rocker reinforcement 110 is highly versatile.

Figure 7:
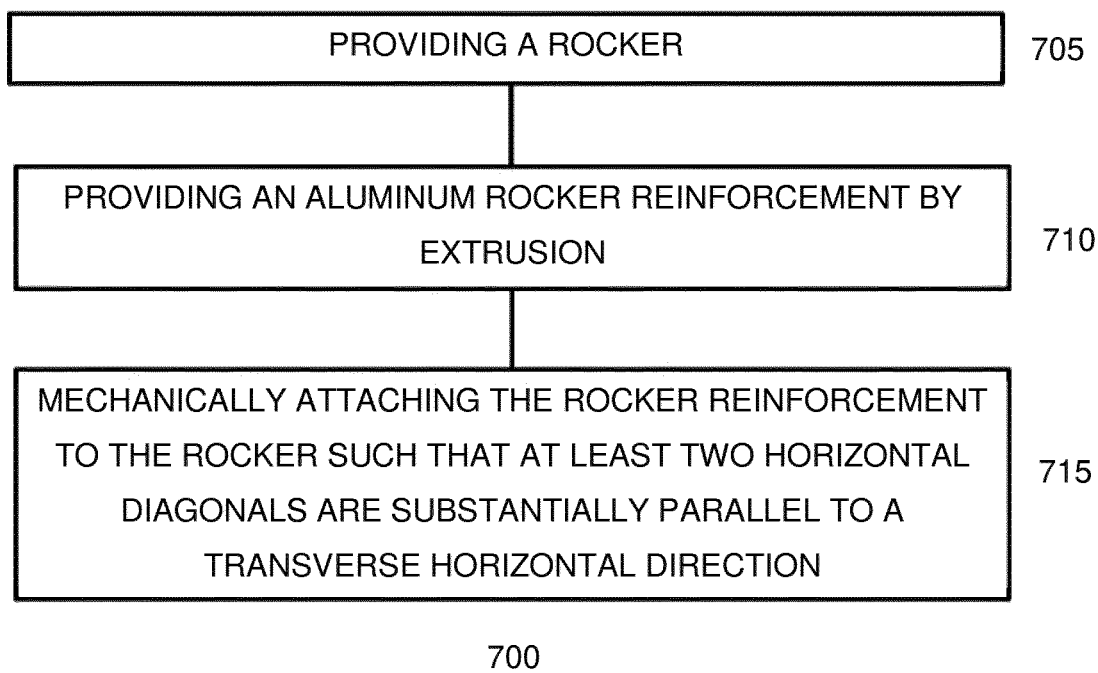
FIG. 7 is a flow chart of a method for manufacturing a rocker for a vehicle with a rocker reinforcement attached to the rocker.

FIG. 7 illustrates a flowchart of a method 700 for manufacturing a rocker 100 for a vehicle with a rocker reinforcement 110 attached to the rocker 100. The rocker 100 and the rocker reinforcement 110 may be any of the rockers 100 and rocker reinforcements 110 illustrated throughout this disclosure.

The method 700 comprises, at block 705, providing a rocker 100. As indicated with respect to FIG. 1, a rocker 100 may include an inner wall 103, an outer wall 102, a lower portion 101 and an upper portion 104. In some examples, a rocker 100 may include an outer rocker panel 202 and an inner rocker panel 203. In this case, an upper portion 104 of the rocker 100 may include an upper portion of the outer rocker panel 202 and an upper portion of the inner rocker panel 203.

A rocker 100 and/or rocker panel 202, 203 may be made of hardened steel, e.g. an ultra-high strength steel (UHSS). UHSS exhibits an optimized maximum strength per weight unit and advantageous formability properties. UHSS may exhibit ultimate tensile strength of as high as 1500 MPa, or even 2000 MPa or more, particularly after a press hardening operation. In such an operation, a steel blank is heated to above an austenization temperature, in particular to above Ac3 to substantially fully austenize the blank. After heating to above this temperature for a period of time, the blank is subjected to a pressing operation in which the blank is deformed. At the same time, the blank is rapidly cooled such that the blank is substantially "fully hardened" and a martensitic microstructure is obtained. Examples of hardened steel include UHSS such as 22MnB5 steel or Usibor® 1500, Usibor® being commercially available from Arcelor Mittal.

Method 700 further comprises, at block 710, providing an aluminum rocker reinforcement 110 with a cross section as disclosed herein by extrusion, e.g. in any of FIGS. 1-6.

In order to obtain an aluminum rocker reinforcement 110 with such a cross section, a die with a cross sectional profile as disclosed herein may be obtained first. A die may be made of steel. The die may be preheated to a temperature between 400-600° C. to facilitate an even flow of aluminum through the die. Once the die is loaded in an extrusion press, an aluminum billet, which may be preheated in order to make it malleable e.g. to a temperature between 400-600° C., is pushed against and through the die by a ram. An aluminum extrusion comes out with a desired cross section. Cooling, aligning and/or cutting of the aluminum extrusion may be additionally performed in order to obtain a rocker reinforcement 110.

Method 700 further includes, at block 715, mechanically attaching the rocker reinforcement 110 to the rocker 100 such that at least two horizontal diagonals 121, 131 are substantially parallel to a transverse horizontal direction.

Figure 8:
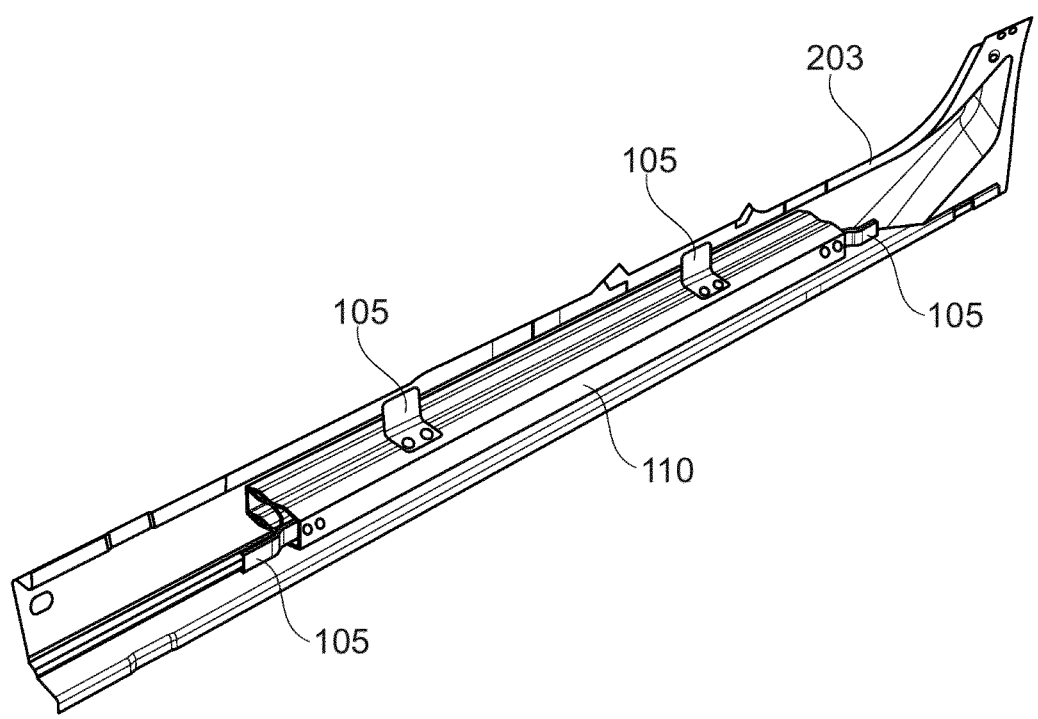
FIGS. 8-9 represent several ways of attaching a rocker reinforcement to a rocker according to several examples.

Several ways may be used to attach a rocker reinforcement 110 to the rocker 100. In some examples, the rocker reinforcement 110 may be attached to an outer rocker panel 202. This is illustrated in FIG. 8, wherein a rocker reinforcement 110 and an inner rocker panel 203 are shown. The outer rocker panel 202 has been left out of this figure so that fastening means 105 may be seen. In this case, two brackets 105 may be used to attach the ends of the rocker reinforcement 110 to the outer wall of the rocker 102, 202. Fastening means 105 may include a steel strip, e.g. a HSLA420 strip, and one or more screws or rivets. In addition, mounting brackets 105 along a length of the reinforcement may be provided as well. The mounting brackets at intermediate portions of the reinforcement in this example may be attached at flanges of the inner panel 203 and/or the outer panel 202.

Figure 9:
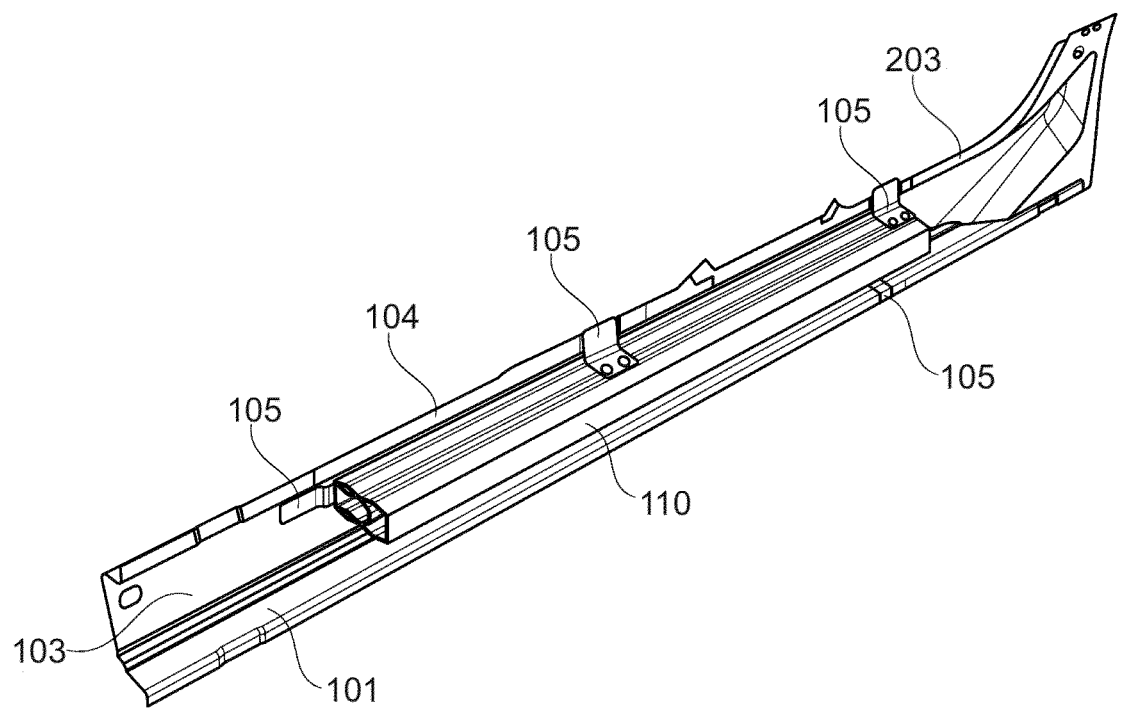

FIG. 9 represents another way to join a rocker reinforcement 110 and a rocker 100. In this example, a rocker reinforcement 110 is attached to an inner rocker panel 203 at four attachment points 105. One of them is used to attach an end of the rocker reinforcement 110 to an inner wall 103, another one of them is used to attach the other end of the rocker reinforcement 110 to a lower portion 101 and the other two are used to attach the rocker reinforcement 110 to an upper flange 104. In general, any number of attachment points 105 may be used to attach a rocker reinforcement 110 to an upper portion 104.

The attachment points may include strips, brackets or other connecting elements from the reinforcement to the rocker structure. Fasteners may include rivets, screws, bolts, but also resins or adhesives. The use of resins, glue or adhesives may reduce vibrations.

"Soft zones" i.e. areas of lower mechanical strength may be provided along several areas of the rocker. Soft zones may be provided to improve ductility and energy absorption in different areas of the rocker.

Also, soft zones may be provided at attachment points, i.e. where screws or rivets or similar may be attached to enable or facilitate the attachment between the rocker and the rocker reinforcement, e.g. wherein the rocker is made of UHSS and the reinforcement is made of aluminum. Smaller soft zones at these attachment points can help to avoid stress concentrations.

The soft zones may be created e.g. by a partial heat treatment after hot forming die quenching. E.g. a laser or induction heater may be used to locally create areas of different microstructure.

In some examples, the flanges or portions of the flanges of the outer and inner panels of the rocker may be formed as a soft zone in a press hardened ultra-high strength steel. If the flanges are made as softer zones, the flanges may more easily be joined to each other, as well as to the reinforcement and avoid stress concentrations at the points of attachment.

Figure 10:
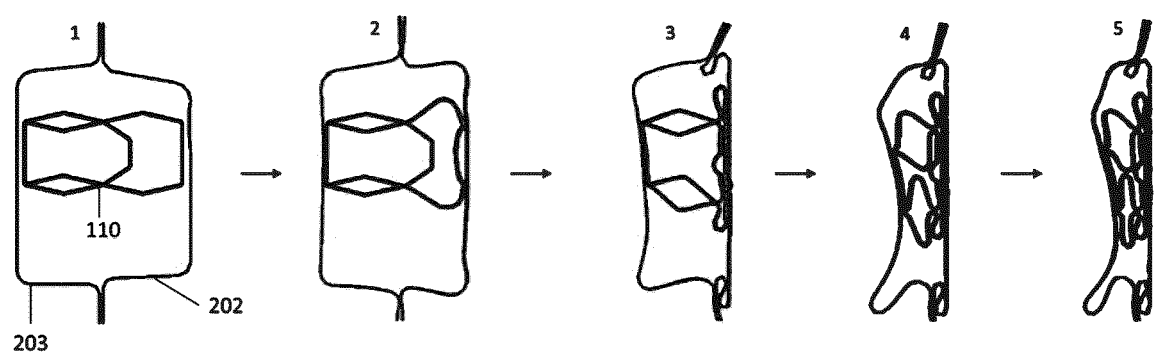
FIG. 10 schematically illustrates an example of a deformation that a cross section of rocker with a rocker reinforcement as disclosed herein may suffer during a crash.

FIG. 10 illustrates an example of a deformation that a cross section of rocker 100 with a rocker reinforcement 110 as disclosed in examples herein may suffer during a crash. Five different moments of time 1-5 have been selected to show this process. At time 1, the rocker 100 and the rocker reinforcement 110 have not been yet compressed. At time 2, outer rocker panel 202 has started to be crushed and outer section 155 has started to distort and absorb energy. Segments 160, 161 are deforming along a substantially vertical direction and thus converting substantially horizontal stresses into substantially vertical stresses. At time 3, outer section 155 is completely compressed and segments 170, 171 have also absorbed energy. Inner section 150 is beginning to deform and the two convex four-sided structures 120, 130 have also begun to absorb energy. At time 4, the two convex four-sided structures 120, 130 are also transforming substantially horizontal stresses into substantially vertical stresses.

At time 5, the lower corner of structure 120 and the upper corner of structure 130 enter into contact, which enhances energy absorption. The rocker 100 and rocker reinforcement 110 are almost crushed.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A reinforcement for a rocker, wherein the reinforcement is made of an elongated profile and configured to be arranged along a longitudinal direction,
   a vertical direction being defined as perpendicular to the longitudinal direction, and a transverse horizontal direction being defined as perpendicular to both the longitudinal direction and the vertical direction, wherein the profile comprises
   an outer section configured to receive an impact of an outer wall of the rocker,
   an inner section comprising an upper convex four-sided structure with an upper horizontal diagonal and an upper inclined diagonal; and
   a lower convex four-sided structure with a lower horizontal diagonal and a lower inclined diagonal;
   the upper and lower horizontal diagonals being parallel to the transverse horizontal direction and wherein the upper and lower convex four-sided structures are separated along the vertical direction.

2. The reinforcement of claim 1, wherein the reinforcement is made of extruded profile.

3. The reinforcement of claim 1, wherein the inclined diagonals are perpendicular to the horizontal diagonals.

4. The reinforcement of claim 1, wherein the lower convex four-sided structure and the upper convex four-sided structure are the same.

5. The reinforcement of claim 1, wherein the lower convex four-sided structure and the upper convex four-sided structure are parallelograms.

6. The reinforcement of claim 1, wherein a thickness of the reinforcement is between 1.5 and 5 mm.

7. The reinforcement of claim 1, wherein the inner section and the outer section each form closed cross-sections.

8. The reinforcement of claim 1, wherein the outer section has a vertical straight outer wall.

9. The reinforcement of claim 8, wherein the outer section has horizontal segments connecting the outer wall with the inner section.

10. A rocker for a vehicle comprising an inner panel, an outer panel, and a reinforcement according to claim 1.

11. The rocker according to claim 10, wherein the inner panel and the outer panel are made of an ultra-high strength steel.

12. A method for manufacturing a rocker for a vehicle with a rocker reinforcement attached to the rocker according to claim 1, the method comprising:

providing a rocker including an inner wall, an outer wall, a lower portion and an upper portion;

providing an aluminum rocker reinforcement with the cross section of claim 1 by extrusion; and mechanically attaching the rocker reinforcement to the rocker such that at least two horizontal diagonals are parallel to a transverse horizontal direction.

13. The method of claim 12, wherein two or more attachment points are used to attach the ends of the rocker reinforcement to the outer or inner wall of the rocker.

14. The method of claim 12, wherein one or more attachment points are used to attach the reinforcement to a lower flange and/or an upper flange of the rocker.

15. The method of claim 12, further comprising creating one or more soft zones on the rocker.

16. The reinforcement of claim 2, wherein the extruded profile is an extruded aluminum profile.

17. The reinforcement of claim 3, wherein an axis on which the upper inclined diagonal lies and an axis on which the lower inclined diagonal lies overlap.

18. The reinforcement of claim 1, wherein the horizontal diagonals are longer than the inclined diagonals.

19. The reinforcement of claim 6, wherein the thickness of the reinforcement is between 2 and 4 mm.

20. The reinforcement of claim 9, wherein the horizontal segments define hinge points.

* * * * *